INVENTOR.
Joseph Richard Vyce
BY
Andrew L. Ney
ATTORNEY

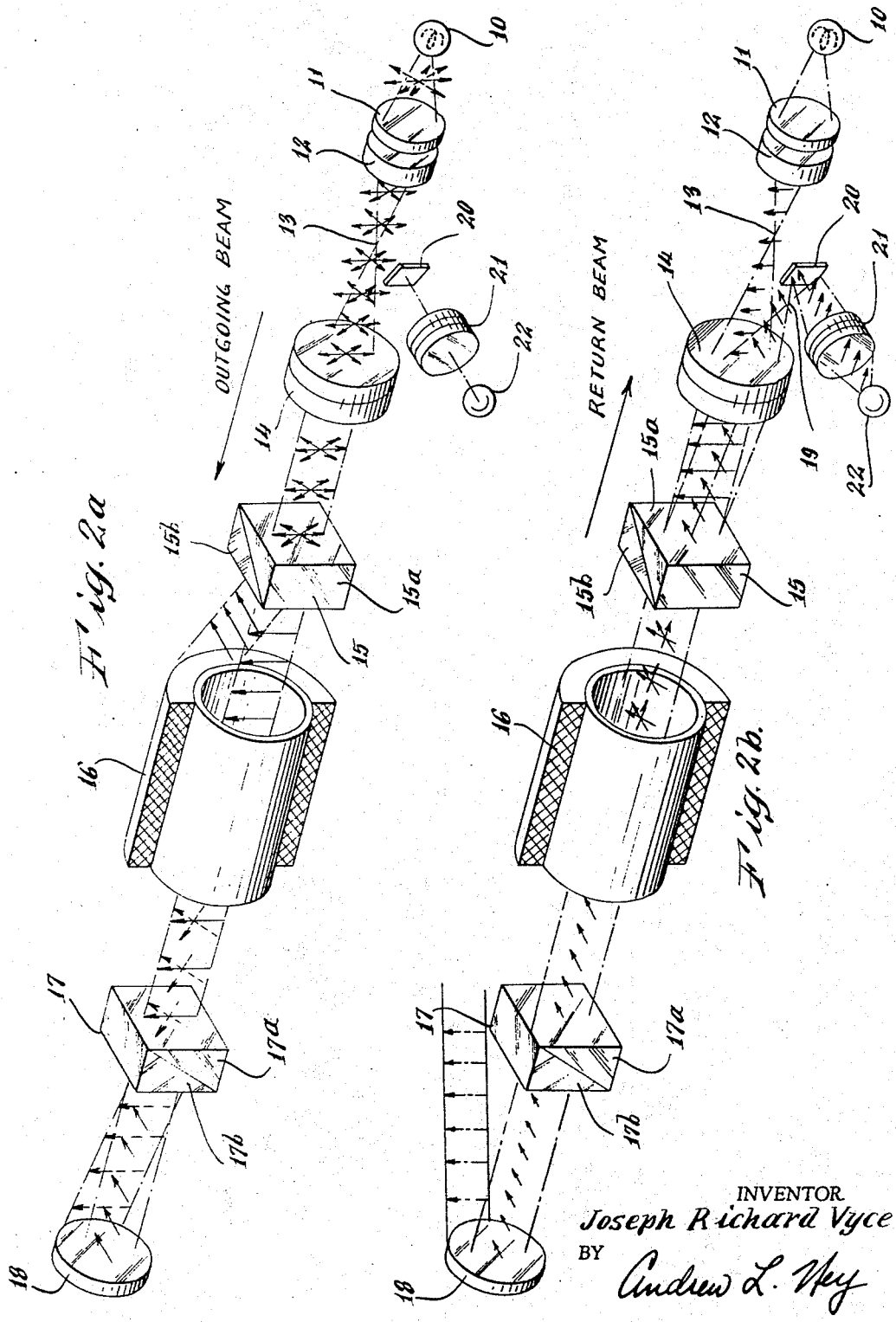

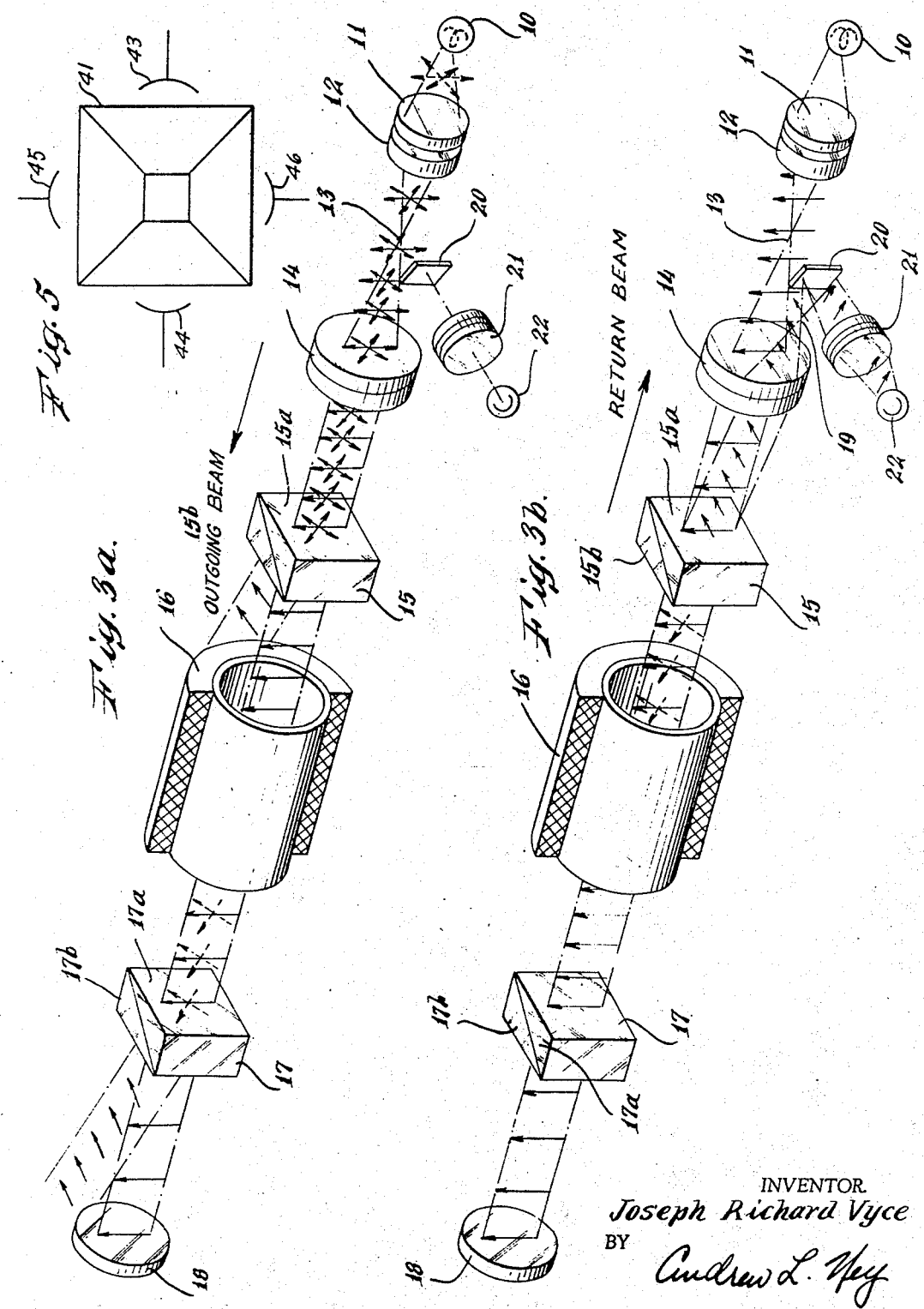

United States Patent Office 3,427,108
Patented Feb. 11, 1969

3,427,108
ELECTRO-OPTICAL APPARATUS FOR MONITORING ROTATIONAL MOVEMENT OF A BODY
Joseph Richard Vyce, Ridgefield, Conn., assignor to The Perkin-Elmer Corporation, Norwalk, Conn., a corporation of New York
Filed Apr. 24, 1964, Ser. No. 362,435
U.S. Cl. 356—117                                           14 Claims
Int. Cl. G01n 21/44

ABSTRACT OF THE DISCLOSURE

An apparatus for monitoring the rotational movement of a remote object. In two versions, rotation about the roll axis is monitored. In a third version, rotations about the roll, pitch and yaw axes are monitored. A polarizer is positioned in front of and connected to a reflector which is mounted on the object being monitored. A Faraday modulated beam of polarized light, produced by directing light from a lamp through a condensing lens, a collimating lens, a polarizing beamsplitter and a Faraday cell in that order, is transmitted through the polarizer and strikes the reflector. The reflected beam passes through the polarizer, Faraday cell, polarizing beamsplitter and collimating lens and is fed into an electro-optical light detection system. In the two versions for measuring roll the electro-optical light detection system includes one phototube. Rotation of the polarizer relative to the polarizing beamsplitter produces a change in the light signal impinging on the phototube. In the version for measuring roll, pitch and yaw the electro-optical light detection system further includes a four sided sensing prism and associated phototubes with these latter items being used to measure pitch and yaw.

General

The present invention relates to alignment measuring apparatus for monitoring the rotational movement of a body. In one arrangement of the invention, the apparatus is a polarimeter operating in the autocollimating mode for monitoring roll or twist movements of a body. In a second arrangement of the invention, the apparatus is a three-axis autocollimator for monitoring all three degrees of rotational movement of a body. Common to both arrangements is the applicatin of the technique of retroreflection wherein the light beam returning to the apparatus from the body being monitored passes through the optical system of the apparatus along substantially the same path followed by the outgoing beam.

In certain applications, such as the alignment of missiles, it is desirable to have both the transmitter and receiver portions of the alignment apparatus remote from the body being monitored. It is common practice, when using a polarimeter to measure roll movements of the body being monitored, to locate the receiver portion of the alignment apparatus either alongside the transmitter or at some other point remote from the monitored body. In such arrangements the returning light beam does not follow the same path as the outgoing beam.

It has been found that if a polarimeter is operated in the autocollimating mode in accordance with the present invention, the technique of retroreflection may be utilized so that both the transmitter and receiver portions of the alignment apparatus may be combined into a single unit. This not only reduces the overall size of the apparatus, but also simplifies the arrangement of the optical system, especially that portion of the system mounted on the object being monitored.

At the present time various techniques for monitoring all three degrees of rotational movement of a body are well known. Generally, these techniques involve the use of a plurality of autocollimators or a two-axis autocollimator used in conjunction with a polarimeter. The desirability of a single optical system for monitoring all three degrees of rotational freedom of a body has long been apparent.

It is an object of the present invention to provide new and improved alignment measuring apparatus.

It is another object of the present invention to provide alignment measuring apparatus which is simple in construction.

It is a further object of the present invention to provide a new and improved polarimeter.

It is a further object of the present invention to provide a new and improved three-axis autocollimator requiring only a single optical system for monitoring all three degrees of rotational movement of a body.

Alignment measuring apparatus constructed in accordance with the present invention comprises a light source for developing a first beam and means for collimating the first beam. The apparatus also includes a polarizing prism for dividing the collimated first beam into second and third beams which are polarized perpendicular to each other and emerge from the prism along diverging paths. Also included in the invention are means for oscillating the second beam to both sides of its plane of polarization and polarizing means for polarizing the oscillated second beam. The invention further includes a reflector for reflecting the polarized oscillated second beam back through the polarizing means to the oscillating means whereat the reflected beam is oscillated to both sides of its plane of polarization. The polarizing prism responsive to the oscillated reflected beam divides the oscillated reflected beam into fifth and sixth beams which are polarized perpendicular to each other and emerge from the polarizing prism along diverging paths. The apparatus of the invention further includes means for detecting and measuring the sixth beam.

For a better understanding of the present invention, together with other and further objects hereof, reference is had to the following description, taken in connection with the accompanying drawings, and its scope will be pointed out in the appended claims.

Referring to the drawings:

FIGURES 2a and 2b show one mode of operation of an autocollimating polarimeter constructed in accordance with the present invention;

FIGURES 3a and 3b show a second mode of operation of an autocollimating polarimeter constructed in accordance with the present invention;

Description and operation of the autocollimating polarimeter

Figure 1:
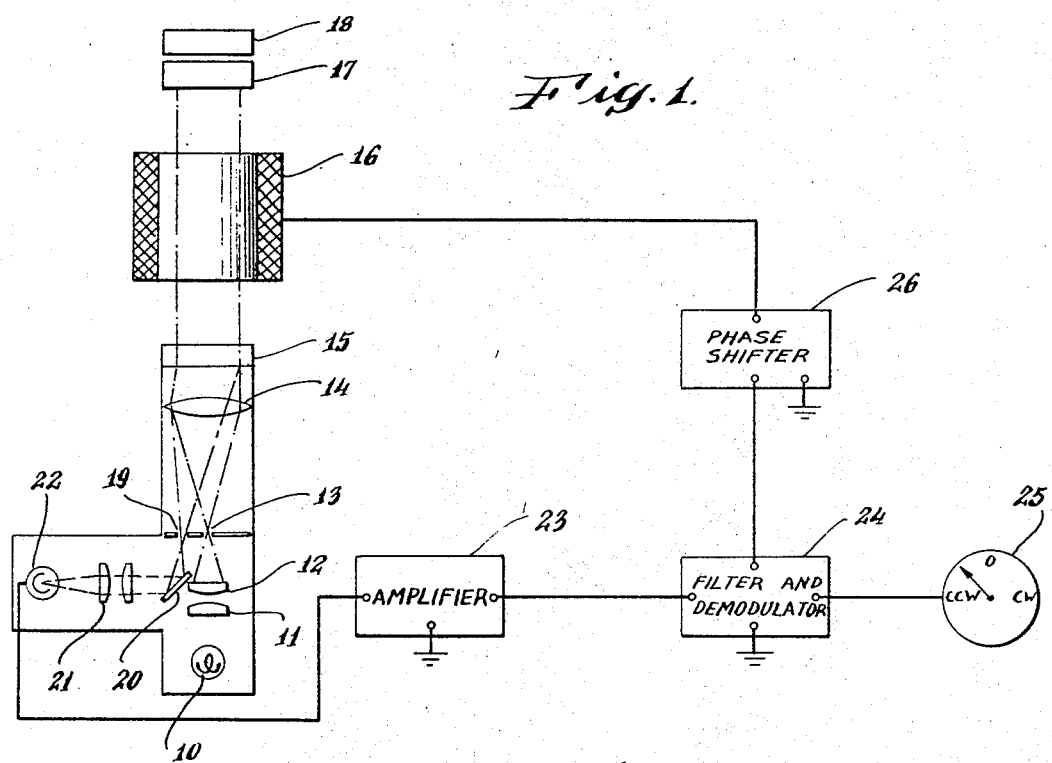
FIGURE 1 is a block diagram of an autocollimating polarimeter constructed in accordance with the present invention.

In FIGURES 2a and 2b which show one mode of operation of an autocollimating polarimeter constructed in accordance with the present invention, FIGURE 2a depicts the effect on the outgoing beam while FIGURE 2b depicts the effect on the return beam. Referring to FIGURES 1, 2a and 2b, wherein similar elements have been given the same reference numerals, an autocollimating polarimeter constructed in accordance with the present invention includes a light source 10 for developing a first beam. Light source 10 may be a tungsten lamp or equivalent device. The filament of light source 10 is re-imaged by condenser lenses 11 and 12 at the source pinhole indicated by reference number 13. The light from source 10 is collimated by a collimator lens 14 and the collimated light passes to a polarizing prism 15.

Polarizing prism 15 divides the collimated light into two beams which are polarized perpendicular to each other and emerge from the prism along diverging paths. Prism 15 may be a conventional Rochon or Wollaston prism characterized by the transmission and separation of orthogonal components of the incident light. For illustrative purposes only, prism 15 may be composed of a glass section 15a and a calcite section 15b cut at certain definite angles and cemented together. Utilizing such a prism in the arrangement shown in FIGURES 2a and 2b, polarizing prism 15 is oriented with the optic axis of the calcite 15b vertical so that vertically polarized light emerges from prism 15 along its optical axis, while horizontally polarized light emerges from the prism deviated from the vertically polarized light and, therefore, from the optical axis. The horizontally polarized light is deviated out of the system.

The vertically polarized light passes to an oscillator 16, which may be a conventional Faraday cell or comparable device, whereat the vertically polarized light is oscillated to both sides of its plane of polarization. The oscillated, vertically polarized light is then transmitted toward the object being monitored.

Mounted on the monitored object is a second polarizer 17 for polarizing the oscillated, vertically polarized light emerging from the Faraday cell. While polarizer 17 is shown to be of simple construction to polarizing prism 15 and effective in developing two beams which are polarized perpendicular to each other and emerge from prism 17 along diverging paths, polarizer 17 may be an absorbing type polarizer which only transmits a single polarized beam. For the particular arrangement shown, polarizing prism 17 is oriented with the optic axis of its calcite section 17b horizontal so that horizontally polarized light emerges from prism 17 along its optical axis, while vertically polarized light emerges from the prism deviated from the horizontally polarized light and, therefore, from the optical axis. All, or substantially all, of the vertically polarized light emerging from prism 17 is deviated out of the system. Were an absorbing type polarizer used instead of prism 17, it would be characterized by the transmission of horizontally polarized light and the absorbtion of the remainder of the incident light.

It is well to note at this point that for each complete cycle of oscillation imparted by the Faraday cell 16 to the vertically polarized light passing through the cell, two pulses of horizontally polarized light emerge from polarizing prism 17 along its optical axis; one pulse for a swing to one side of the plane of polarization of the vertically polarized beam and the second pulse for a swing to the opposite side of this plane of polarization.

A reflector 18, mounted behind polarizing prism 17 on the object being monitored, reflects the horizontally polarized light back through prism 17 along the optical axis of the prism to the Faraday cell 16. At this point the horizontally polarized light is oscillated to both sides of its plane of polarization. The oscillated, horizontally polarized light, in turn, passes to polarizing prism 15 whereat this light is divided into two beams which are polarized perpendicular to each other and emerge from prism 15 along diverging paths. Because prism 15 is oriented with the optic axis of calcite 15b vertical, vertically polarized light emerges from the prism along the optical axis of the prism, while horizontally polarized light is deviated from the vertically polarized light and, therefore, from the optical axis of the prism.

Both the vertically polarized and horizontally polarized beams emerging from prism 15 in the return direction, pass through collimator lens 14 and are autocollimated, the vertically polarized component at source pinhole 13, the horizontally polarized component at a point 19 which is off of the optical axis. The autocollimated, horizontally polarized component is deflected by a flat mirror 20 to a condenser arrangement 21 and further to a detector 22 at which point the horizontally polarized light is detected. The detector 22 develops an electrical signal having a magnitude related to roll errors of the object being monitored. The term "roll," as used herein, means the angular rotation of the object about the optical axis of the system.

For the condition shown in FIGURES 2a and 2b, where the optic axes of the calcite sections 15b and 17b are crossed or perpendicular to each other, the polarimeter will provide a null or aligned indication. For this condition the electrical signal developed by the detector 22 is a pulsating D-C signal having a frequency equal to twice the frequency of the signal supplied to the Faraday cell. This is most readily understood by considering that two equal, horizontally polarized pulses emerge from polarizing prism 17 for each cycle of oscillation imparted by Faraday cell 16, and that when detected by the detector 22 the corresponding electrical signal has a single cycle of pulsating D-C for each horizontally polarized pulse. In other words, for perfect alignment, the output electrical signal goes through two complete cycles for every cycle of oscillation of the Faraday cell.

As polarizing prism 17 and reflector 18 rotate about their optical axes due to roll movements imparted to the object being monitored, the horizontally polarized pulses are no longer of equal amplitude. That pulse developed from a swing by the Faraday cell in the same direction as the roll movement decreases in amplitude while the other pulse increases in amplitude. Under these conditions, the electrical signal developed by the detector 22 is still a pulsating D-C signal except that only alternate pulses are of equal amplitude. Thus, this signal goes through one complete cycle for every cycle of oscillation imparted by the Faraday cell and the frequency of this electrical signal is the same as the frequency of the signal driving the Faraday cell. The effect occurring from the Faraday modulation of a previously modulated polarized beam is a second order one and is negligible. It should be so noted that the horizontally polarized pulses passed by prism 17 are equal in magnitude and opposite in direction but this system does not distinguish between 180° components.

The detector signal is amplified by an amplifier 23 and the amplified signal is passed to a filter and demodulator 24 of conventional design. The filter and demodulator 24 also receives a reference signal of the same frequency as the frequency of the signal supplied to Faraday cell 16. The filter and demodulator removes all components of the signal passed from amplifier 23 except that component having a frequency equal to the frequency of the signal supplied to Faraday cell 16 and thereby develops a D.-C. signal for driving a meter 25 which provides visual indications of the roll movements.

As previously mentioned, under conditions of perfect alignment of the monitored body, the frequency of the detector signal is twice the frequency of the signal driving the Faraday cell. This detector signal, therefore, will not contain any component equal in frequency to the frequency of the signal driving the Faraday cell. This will result in zero output from filter and demodulator 24 and a zero reading of meter 25.

As the monitored body undergoes roll errors, a component of the detector signal appears which is equal in frequency to the frequency of the signal driving the Faraday cell. Now, the filter and demodulator 24 will pass a component of the detector signal having a frequency equal to the frequency of the signal driving the Faraday cell. The amplitude of this component will determine the amount of deflection of the needle of meter 25. The phase of the detector signal, relative to the phase of the signal driving the Faraday cell, determines the direction of deflection of the needle of meter 25.

A phase shifter 26 is inserted between the source of the signal driving the Faraday cell and the filter and demodulator 24. Phase shifter 26 serves to compensate for errors introduced in the Faraday cell 16 due to the inductive components in the cell.

At this point it is well to point out a modification which may be made to the apparatus of FIGURE 1 which does not involve a departure from the principles underlying the invention. In the apparatus of FIGURE 1 the light source 10 is positioned on the optical axis of the polarimeter while the detector 22 is positioned off of the optical axis. It will be obvious that the positions of the light source 10 and the detector 22 may be changed without departing from the principles underlying the invention. For such a modification the orientation and structure of polarizing prism 15 would have to be altered so that the unpolarized light reaching prism 15 in the outgoing direction is divided into a vertically polarized beam which emerges along the optical axis of the prism and a horizontally polarized beam which emerges from the prism deviated from the optical axis. The oscillated return beam emerging from oscillator 16 is, in turn, divided by prism 15 into a horizontally polarized beam which emerges from the prism along the optical axis of the prism, and a vertically polarized beam which emerges from the prism deviated from the optical axis.

In FIGURES 3a and 3b which show a second mode of operation of an autocollimating polarimeter constructed in accordance with the present invention, FIGURE 3a depicts the effect on the outgoing beam while FIGURE 3b depicts the effect of the return beam. Elements in FIGURES 3a and 3b corresponding to elements in FIGURES 1, 2a and 2b have been given the same reference numerals. Referring to FIGURES 3a and 3b, it is readily apparent that the major distinction between the polarimeter shown in these figures and the polarimeter shown in FIGURES 2a and 2b is the orientation of polarizing prism 17. As previously described in connection with FIGURES 2a and 2b, a null indication corresponding to no roll movement is developed when the optic axes of calcite sections 15b and 17b are crossed. It will be seen that such a null indication is also achieved when the optic axes of the calcite sections 15b and 17b are aligned in the manner shown in FIGURES 3a and 3b. Since the mode of operation depicted in FIGURES 3a and 3b is basically similar to the mode of operation depicted in FIGURES 2a and 2b, a detailed description of FIGURES 3a and 3b will be omitted.

Referring to FIGURES 3a and 3b, the polarizing prism 15 is effective to divide an outgoing unpolarized collimated beam into a vertically polarized beam which emerges from the prism along the optical axis of the prism and a horizontally polarized beam which emerges from the prism deviated from the optical axis. Faraday cell 16 oscillates the vertically polarized light to both sides of its plane of polarization and transmits the oscillated, vertically polarized light to polarizing prism 17. Polarizing prism 17 again divides the oscillated, vertically polarized light into two beams which are polarized perpendicular to each other and emerge from the prism along diverging paths. Because the optic axis of calcite 17b is now vertical, the vertically polarized beam emerges from the prism along the optical axis of the prism, while the horizontally polarized beam emerges from the prism deviated from the optical axis. The vertically polarized beam emerging from polarizing prism 17 is reflected by reflector 18 back through polarizing prism 17 along its optical axis to Faraday cell 16 whereat this beam is oscillated to both sides of its plane of polarization. The oscillated beam emerging from Faraday cell 16 passes to polarizing prism 15 whereat it is divided into two beams which are polarized perpendicular to each other and emerge from prism 15 along diverging paths. Since polarizing prism 15 is oriented with the optic axis of calcite 15b vertical, vertically polarized light emerges from the prism along the optical axis of the prism, while horizontally polarized light emerges deviated from the optical axis.

For each cycle of oscillation imparted by the Faraday cell 16 to the vertically polarized light reflected by reflector 18, two pulses of horizontally polarized light emerge from polarizing prism 15 along its optical axis; one pulse for a swing to one side of the plane of polarization of the vertically polarized return beam and the second pulse for a swing to the opposite side of the plane of polarization. If the optic axes of calcite sections 15b and 17b are aligned, these pulses are of equal amplitude and result in the development by detector 22 of a pulsating D.-C. signal having a frequency equal to twice the frequency of the signal supplied to the Faraday cell 16.

As polarizing prism 17 and reflector 18 rotate about their optical axes due to roll movements introduced to the object being monitored, the horizontally polarized pulses are no longer of equal amplitude. The component of light, previously identified as the vertically polarized light emerging from prism 17 in the outgoing direction, now returns as an angle to the vertical plane equal to the roll movement. That horizontally polarized pulse developed from a swing in the same direction as the roll movement increases in amplitude while the other pulse decreases in amplitude. The electrical signal developed by the detector 22 is a pulsating D-C signal with alternate pulses of equal amplitude. Thus, this signal has a frequency equal to the frequency of the signal driving the Faraday cell 16. The phase of this signal indicates the direction of roll while the amplitude is related to the amount of roll. The signal is processed in the same way as is the detector signal devoloped by the arrangement in FIGURES 2a and 2b.

*Description and operation of the three-axis autocollimator*

Figure 4:
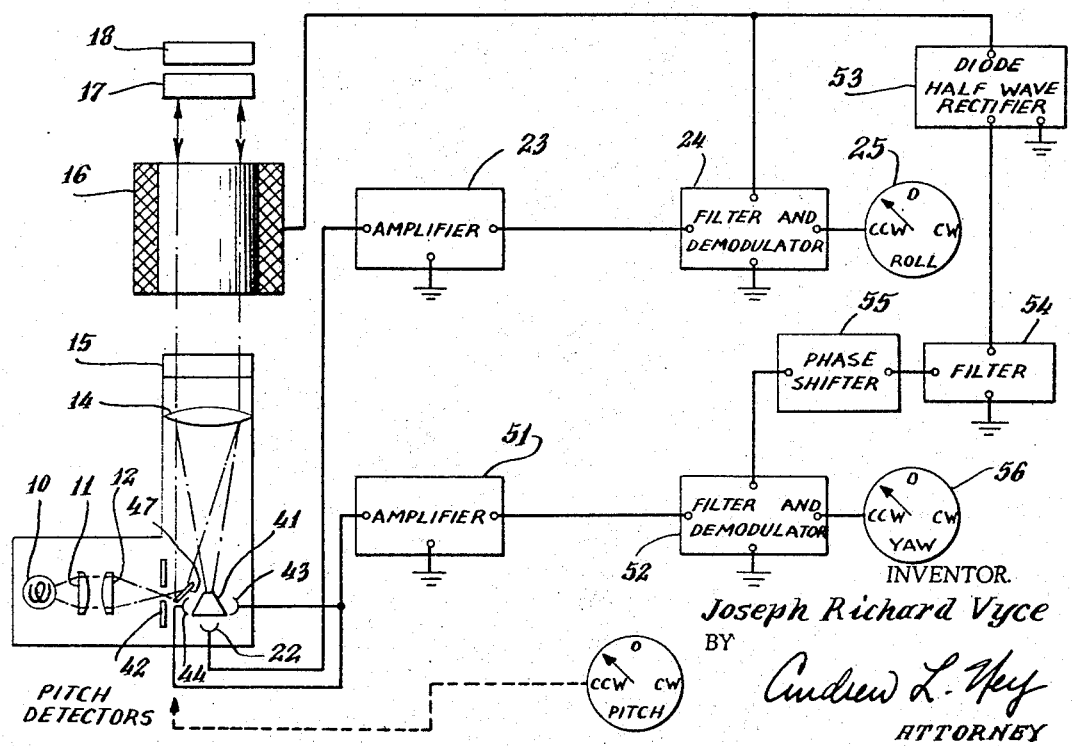
FIGURE 4 is a block diagram of a three-axis autocollimator constructed in accordance with the present invention; and, FIGURE 5 is a plan view of the sensing prism and associated detectors of the three-axis autocollimator of FIGURE 4.

Referring to FIGURE 4 which is a block diagram of a three-axis autocollimator constructed in accordance with the present invention, for measuring angular rotation about the pitch and yaw axes in addition to the roll axis wherein the roll axis is the optical axis of the system and the pitch and yaw axes are the horizontal and vertical axes respectively lying in a plane perpendicular to the roll axis. It will be apparent that this autocollimator utilizes an autocollimating polarimeter such as the one previously described in connection with FIGURES 1, 2a, 2b, 3a and 3b. Elements in FIGURE 4 corresponding to elements in FIGURES 1, 2a, 2b, 3a and 3b have been given the same reference numerals. It should be noted that the FIGURE 4 apparatus incorporates the modification to the autocollimating polarimeter previously suggested. Specifically, in the FIGURE 4 apparatus, the light source 10 is positioned off of the optical axis of the polarimeter, while the detector 22 is positioned on the optical axis of the polarimeter.

Since the FIGURE 4 apparatus functions in a manner similar to the apparatus of FIGURE 1 up to the point at which the return beam is detected, a detailed description of the operation of the FIGURE 4 apparatus up to this point will be eliminated. It is sufficient to state that regardless of which mode of operation is utilized, optic axes crossed or optic axes aligned, two beams, one polarized horizontally, the other polarized vertically, emerge from polarizing prism 15 in the return direction. The horizontally polarized beam emerges along the optical axis of prism 15, while the vertically polarized beam emerges deviated from the optical axis.

Collimator lens 14 autocollimates the horizontally polarized component at the opening of a sensing prism 41, as can be seen in FIGURE 5. Adjacent the four sides of the sensing prism 41 are four detectors 43, 44, 45 and 46. Two of these detectors 43 and 44 are shown in FIGURE 4. The four sides of the sensing prism 41 are reflective. The sensing prism 41 and the four detectors adjacent the four sides of the prism are so arranged that if a beam of light is received along the optical axis of the prism, the four detectors either receive no light or all receive the same amount of light. The particular mode of operation is dependent upon the side of the opening and the size of the beam. As this beam of light moves off of the optical axis, more of it falls on one or two juxtaposed sides of the prism. The detectors adjacent the sides which receive more light sense this shift in the beam and develop signals in response to the light falling on these detectors.

FIGURE 4 shows that detectors 43 and 44 are used together to drive the yaw channel. The two detectors not shown, but adjacent the two remaining sides of prism 41, are used in conjunction to drive the pitch channel.

Detector 22, used to detect roll errors, is placed immediately behind sensing prism 41 where it receives energy passing through the opening in the prism and operates in the manner previously described in connection with FIGURES 1, 2a, 2b, 3a and 3b.

A lamp field-stop 42 of the precise size and shape of the opening of the prism 41 is added between condenser lens 12 and a flat mirror 47.

If a movement is introduced in either pitch or yaw to the body being monitored, the field-stop image will be shifted partially off of the opening of prism 41 and some energy will thus be reflected to the detectors adjacent the four sides of the prism. The signal developed by the detectors will be proportional to the magnitude of the deviation, while by connecting the detectors in opposing polarity, the phase of the signal will indicate the direction of deviation.

The signals developed by detectors 43 and 44 are supplied to an amplifier 51 and the amplified signal is, in turn, passed to a filter and demodulator 52 at which point all components of the signal, except that component having a frequency equal to twice the frequency of the signal supplied to the Faraday cell, are removed. In order to derive this component, the filter and demodulator 52 is supplied with a reference signal having a frequency equal to twice the frequency of the Faraday cell driving signal. This reference signal is developed by passing the Faraday cell driving signal to a diode half wave rectifier 53. The output of rectifier 53 is supplied to a filter 54 which removes all components of the rectified signal except that component having a frequency equal to twice the frequency of the Faraday cell driving signal. The output from filter 54 is passed to a phase shifter 55 whereat this signal is shifted in phase to compensate for phase shifts introduced by filter 54 and phase lags inherent in the Faraday cell because of its inductive nature. The output of the phase shifter is supplied as the reference signal to the filter and demodulator 52 which develops a D-C signal which indicates the phase of the electrical signal developed by the yaw detectors and, in turn, drives a meter 56 for direct viewing of the yaw error.

The pitch channel which develops indications of the pitch error, using detectors 45 and 46, has not been shown but would be of similar construction and operation to the yaw channel.

While there has been described what are at present considered to be the preferred embodiments of this invention, it will be obvious to those skilled in the art that various changes and modifiactions may be made therein without departing from the invention, and it is therefore aimed to cover all such changes and modifications as fall within the true spirit and scope of the invention.

What is claimed is:
1. Alignment measuring apparatus comprising:
 (a) a source of light;
 (b) a collimator lens positioned to receive light from the source and transmit therefrom a collimated first beam of light, the collimator lens having an optical axis;
 (c) a beam dividing polarizing prism in optical alignment with the collimator lens for dividing the first beam into polarized second and third beams, the second beam being vertically polarized and emerging along said optical axis and the third beam being horizontal polarized and emerging deviated from said optical axis;
 (d) oscillating means located along said optical axis for oscillating the polarization axis of the second beam to both sides of its plane of polarization to produce an oscillating second beam and thus increase sensitivity;
 (e) polarizing means located along said optical axis for analyzing the oscillating second beam by transmitting a polarized fourth beam along said optical axis;
 (f) a reflector for reflecting the fourth beam, the reflected fourth beam passing back through the polarizing means to the oscillating means whereat the reflected fourth beam is oscillated to both sides of its plane of polarization, the beam dividing polarizing prism then acting on the oscillating reflected fourth beam by dividing the oscillating reflected fourth beam into a vertically polarized sixth beam and a horizontally polarized seventh beam, one of the beams emerging along said optical axis and the other beam emerging deviated from said optical axis; and
 (g) means located along the axis of the seventh beam for detecting and measuring the intensity of the seventh beam;
whereby the intensity is proportional to the relative roll angular displacement of the beam dividing polarizing prism and the polarizing means.

2. The apparatus according to claim 1 and wherein the light source is located on said optical axis and the means for detecting and measuring the intensity of the seventh beam is located off said optical axis.

3. The apparatus according to claim 1 and wherein the light source is located off said optical axis and the means for detecting and measuring the intensity of the seventh beam is located on said optical axis.

4. The apparatus according to claim 1 and wherein the polarizing means comprises a beam dividing polarizing prism.

5. The apparatus according to claim 1 and wherein the means for detecting and measuring the intensity of the seventh beam comprises a detector responsive to the seventh beam and developing a signal proportional to the intensity of the seventh beam and means for extracting that component of the signal having a frequency equal to the oscillation frequency of the oscillating means and for measuring the amplitude of said component of the signal.

6. The apparatus according to claim 1 and wherein the oscillating means is a Faraday cell.

7. The apparatus according to claim 1 and wherein the polarizing means and the reflector are mounted on an object at a remote distance and the oscillating second beam is transmitted to this object.

8. The apparatus according to claim 1 and wherein the beam dividing polarizing prism includes a glass section and a calcite section.

9. The apparatus according to claim 8 and wherein the optic axis of the calcite section and the optic axis of the polarizing means are substantially crossed.

10. The apparatus of claim 8 wherein the optic axis of the calcite section and the optic axis of the polarizing means are substantially aligned.

11. An alignment apparatus comprising:
 (a) a source of light;
 (b) a collimator lens positioned to receive light from the source and transmit therefrom a collimated first beam of light, the collimator lens having an optical axis;
 (c) a beam dividing polarizing prism in optical alignment with the collimator lens for dividing the first beam into polarized second and third beams, the second beam being vertically polarized and emerging along said optical axis and the third beam being horizontally polarized and emerging deviated from said optical axis;

(d) oscillating means located along said optical axis for oscillating the polarization axis of the second beam to both sides of its plane of polarization to produce an oscillating second beam and thus increase sensitivity;

(e) polarizing means located along said optical axis for analyzing the oscillating second beam by transmitting a polarized fourth beam along said optical axis;

(f) a reflector for reflecting the fourth beam, the reflected fourth beam passing back through the polarizing means to the oscillating means whereat the reflected fourth beam is oscillated to both sides of its plane of polarization, the beam dividing polarizing prism then acting on the oscillating reflected fourth beam by dividing it into a vertically polarized sixth beam and a horizontally polarized seventh beam, one of the beams emerging along said optical axis and the other beam emerging deviated from said optical axis;

(g) a first detector located along the axis of said seventh beam and responsive to said seventh beam for developing a signal proportional to the intensity of said seventh beam;

(h) means for extracting that component of said signal having a frequency equal to the oscillation frequency of said oscillating means and for measuring the amplitude of said component of said signal;

(i) a sensing prism having four reflective sides, located along the axis of the seventh beam and responsive to said seventh beam for reflecting those portions of said seventh beam which fall on any of said sides of said prism;

(j) a plurality of detectors, one associated with each side of said sensing prism, for receiving light reflected by said sides of said sensing prism and for developing signals having amplitudes proportional to the amount of reflected light;

(k) means for connecting oppositely disposed detectors of said plurality of detectors in opposing polarity thereby combining said signals developed by oppositely disposed detectors; and (l) means for extracting those components of said combined signals having a frequency equal to twice the oscillation frequency of said oscillating means and for measuring the amplitudes of said components of said combined signals.

12. The apparatus according to claim 11 and wherein the sensing prism has a central opening through which at least a portion of the seventh beam passes and the first detector is positioned behind the central opening and is responsive to that portion of the seventh beam which passes through the central opening.

13. The apparatus according to claim 11 and wherein the oscillating means is a Faraday cell.

14. The apparatus according to claim 11 and wherein the polarizing means comprises a beam dividing polarizing prism and wherein each beam dividing polarizing prism comprises a glass section and a calcite section.

References Cited

UNITED STATES PATENTS

| | | | |
|---|---|---|---|
| 2,540,780 | 2/1951 | Gabel et al. | 350—157 X |
| 2,703,505 | 3/1955 | Senn | 88—14 |
| 2,998,746 | 9/1961 | Gievers | 88—14 |
| 3,079,835 | 3/1963 | Saperstein | 88—14 |
| 3,257,894 | 6/1966 | Grosjean | 88—14 |
| 3,316,799 | 5/1967 | Daley et al. | 88—14 |

FOREIGN PATENTS 1,327,904  4/1963  France.

OTHER REFERENCES

King et al.: Sensitive Method for the Measurement of Small Rotations, Jour. of Sci. Inst., vol. 36, December 1959, pp. 507–509.

Meltzer, R. J.: Magneto Optic Positioning, IEEE Transactions on Industrial Electronics, vol. IELO, No. 1, May 1963, pp. 46–56.

JEWELL H. PEDERSEN, *Primary Examiner.*

A. A. KASHINSKI, *Assistant Examiner.*

U.S. Cl. X.R.

350—151; 250—225; 356—152